(12) United States Patent
Tominaga et al.

(10) Patent No.: US 9,488,735 B2
(45) Date of Patent: Nov. 8, 2016

(54) POSITIONING APPARATUS, GNSS RECEIVER, INFORMATION TERMINAL DEVICE, POSITIONING METHOD AND PROGRAM

(75) Inventors: Takaki Tominaga, Nishinomiya (JP); Kazuto Tada, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 663 days.

(21) Appl. No.: 14/006,644

(22) PCT Filed: Mar. 13, 2012

(86) PCT No.: PCT/JP2012/056432
§ 371 (c)(1),
(2), (4) Date: Sep. 20, 2013

(87) PCT Pub. No.: WO2012/128126
PCT Pub. Date: Sep. 27, 2012

(65) Prior Publication Data
US 2014/0009331 A1 Jan. 9, 2014

(30) Foreign Application Priority Data
Mar. 23, 2011 (JP) .................................. 2011-063995

(51) Int. Cl.
*G01S 19/40* (2010.01)
*G01S 19/07* (2010.01)

(52) U.S. Cl.
CPC ............... *G01S 19/40* (2013.01); *G01S 19/07* (2013.01)

(58) Field of Classification Search
CPC ........ G01S 19/40; G01S 19/07; G01S 19/35; G01S 19/37
USPC .......................... 342/357.23, 357.75, 357.77
See application file for complete search history.

(56) References Cited

U.S. PATENT DOCUMENTS

2006/0262010 A1 11/2006 Sato

FOREIGN PATENT DOCUMENTS

| CN | 101089650 A | 12/2007 |
|----|-------------|---------|
| CN | 101419274 A | 4/2009 |
| CN | 101487883 A | 7/2009 |
| CN | 101726745 A | 6/2010 |
| CN | 101893714 A | 11/2010 |
| JP | 2007187592 A | 7/2007 |
| WO | 2007032947 A1 | 3/2007 |

OTHER PUBLICATIONS

Bidaine, Benoit, "Ionosphere Crossing of GALILEO Signals", University of Liege, Jun. 26, 2006, 120 pages.
Japanese Patent Office, International Search Report of PCT/JP2012/056432, WIPO, Jun. 8, 2012, 1 page.
ISA European Patent Office, Extended European Search Report in European Patent Application No. EP12761263, Sep. 10, 2014, Germany, 5 pages.
Nava, B. et al., "A New Version of the NeQuick Ionosphere Electron Density Model," Journal of Atmospheric and Solar-Terrestrial Physics, vol. 70, No. 15, pp. 1856-1862, Dec. 2008, 7 pages.
Intellectual Property Office of the People's Republic of China, Office Action and Search Report Issued in Application No. 201280014639.4, Oct. 29, 2014, 10 pages.

*Primary Examiner* — Harry Liu
(74) *Attorney, Agent, or Firm* — Alleman Hall McCoy Russell & Tuttle LLP (57) ABSTRACT

A positioning apparatus is provided that may include a pseudo distance measurement unit that measures the pseudo distance between the positioning satellite and the antenna, an ionosphere delay amount calculating unit that calculates an ionosphere delay amount included in the pseudo distance, and a pseudo distance corrector that executes a positioning calculation by correcting the pseudo distance based on the ionosphere delay amount. The ionosphere delay amount calculating unit sets the upper limit of the partition number between the positioning satellite and the antenna, determines the total number of electrons sTEC by integrating in the range of less than the upper limit of the partition number, and calculates the ionosphere delay amount based on the determined total number of electrons sTEC.

13 Claims, 10 Drawing Sheets

Profile example from NeQuick version 1 (ITU-R) (ESTEC location – 52.217°N, 4.42°E –, May, average solar flux – Φ12 = 100 –, midday universal time)

Fig.9A

| Position and geomagnetism | |
|---|---|
| Height | $h$ [km] |
| Latitude | $\varphi$ [°] |
| Longitude | $\theta$ [°] |
| Magnetic latitude | $\Lambda$ [°] |
| Magnetic dip | $I$ [°] |
| Modified dip latitude | $\mu$ [°] (cf. equation 3.5) |

| Solar activity | |
|---|---|
| Monthly mean of $F10.7$ | $\Phi$ [$10^{-22}$ W m$^{-2}$ Hz$^{-1}$] |
| Monthly smoothed value of $F10.7$ | $\Phi_{12}$ [$10^{-22}$ W m$^{-2}$ Hz$^{-1}$] |
| Monthly smoothed sunspot number | $R_{12}$ (cf. equation 3.3) |

| Time and season | |
|---|---|
| Universal time | $UT$ [hours] |
| Local time | $LT$ [hours] |
| Month | month |
| Zenith angle of the sun | $\chi$ [°] |

Fig.9B

| | |
|---|---|
| Electron density of layer $L$ | $N^L$ [$10^{11}$ $el.m^3$] |
| Peak electron density of layer $L$ | $N^L_{max}$ [$10^{11}$ $el.m^3$] |
| Global electron density at the peak height of layer $L$ | $NmL$ [$10^{11}$ $el.m^3$] |
| Peak height of layer $L$ | $h^L_{max}$ [$km$] |
| Thickness parameter of layer $L$ | $B^L$ [$km$] |
| Critical frequency of layer $L$ | $f_0L$ [$MHz$] |
| Transmission factor | $M(3000)F_2$ |

POSITIONING APPARATUS, GNSS RECEIVER, INFORMATION TERMINAL DEVICE, POSITIONING METHOD AND PROGRAM

FIELD OF THE INVENTION

The present invention relates to a technique that calculates an ionospheric delay amount by using an ionospheric model such as the NeQuick, etc., and performs positioning.

BACKGROUND ART

When an electric wave passes through the ionosphere, the velocity of the electric wave is in proportion to the electron density and is slowed by only an amount in inverse proportion to the square of the frequency of the electric wave (ionospheric delay). An ionospheric delay amount $D_{iono}$[m] caused by the ionosphere is derived by the following formula 1.

$$Diono = \frac{40 \cdot 3}{f^2} TEC \quad \text{[Formula 1]}$$

Here f is the frequency of the electric wave, TEC (Total Electron Content) is the total number of free electrons (total number of electrons) on a line of sight path between a receiver and a satellite, and the units are expressed as TECU (TEC units). In addition, 1 TECU means that $10^{16}$ electrons are included per 1 $m^2$ base area along the line of sight.

Conventionally, it has been proposed to correct errors by this ionospheric delay amount using the Klobuchar model, IRI (International Reference Ionosphere), Bent model, or an ionospheric model using a DGR model, etc., that calculates the electron density based on the ionosphere E, F1, and F2 layers.

In particular, in the Galileo navigation satellite system that has been developed by Europe and is planned to operate soon as a GNSS (Global Navigation Satellite System) for the general consumer marketplace, a NeQuick model recommended by ITU-R is used as the ionospheric model.

The NeQuick model integrates and shows the electron density in a predetermined month, geography, latitude, longitude, height, and universal time based on the forms of Epstein layers (E, F1, F2 layers) among the ionosphere (see the Non-Patent Document 1).

Figure 8:
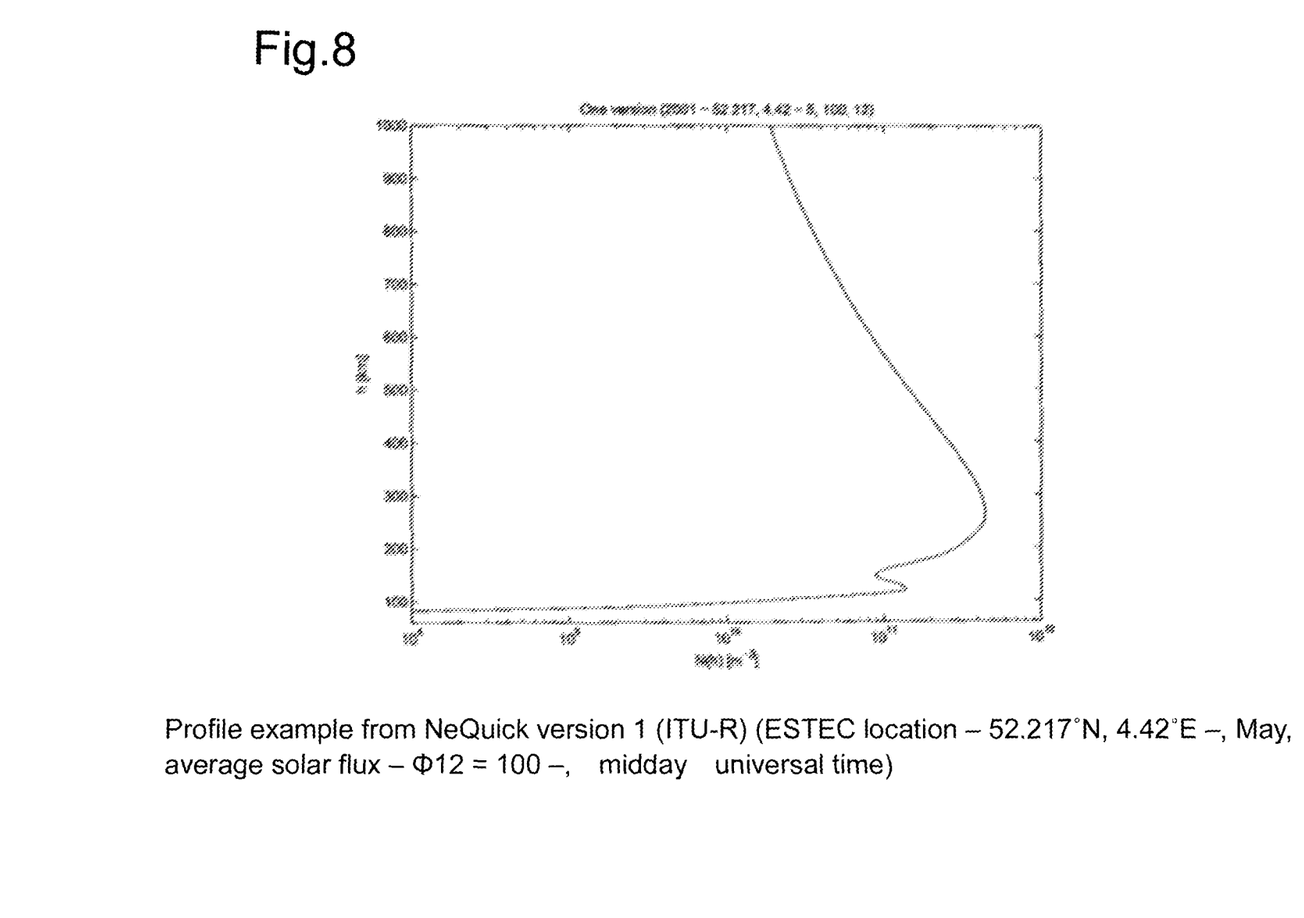
FIG. 8 is a drawing showing an example of the ionospheric model of NeQuick.
Figure 9A:
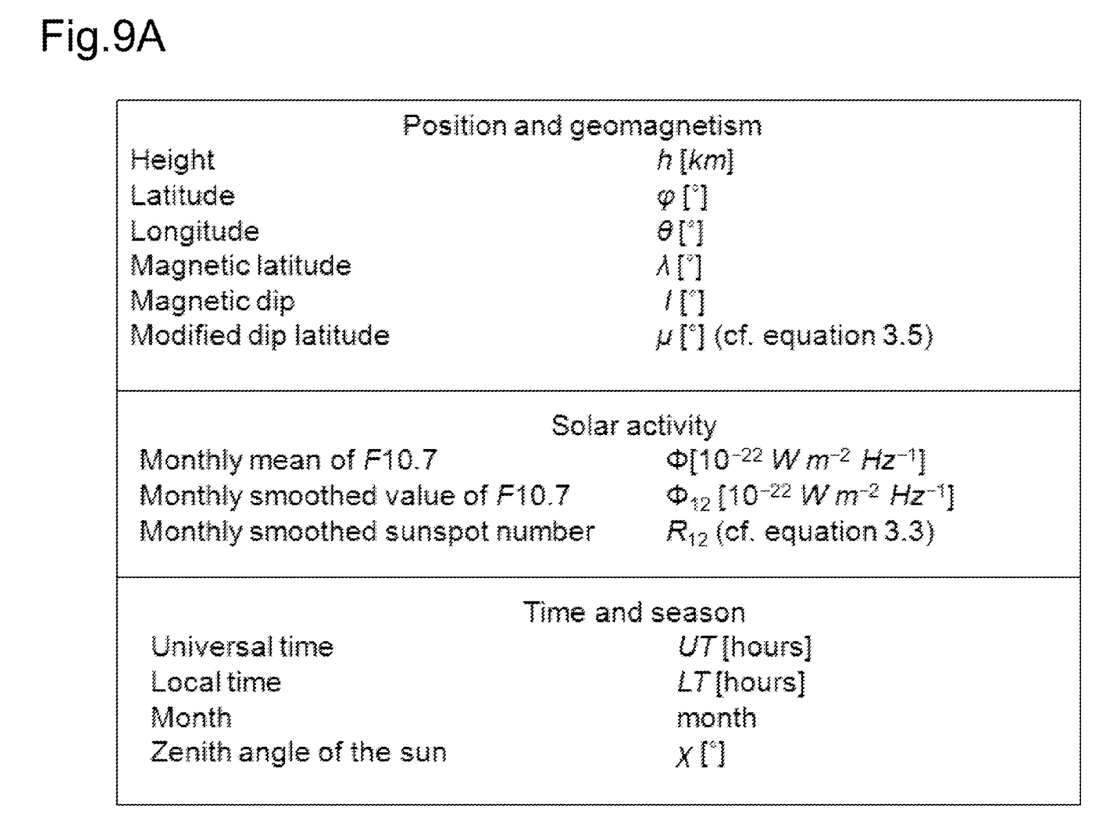
FIG. 9A shows principal variables used in NeQuick.
Figure 9B:
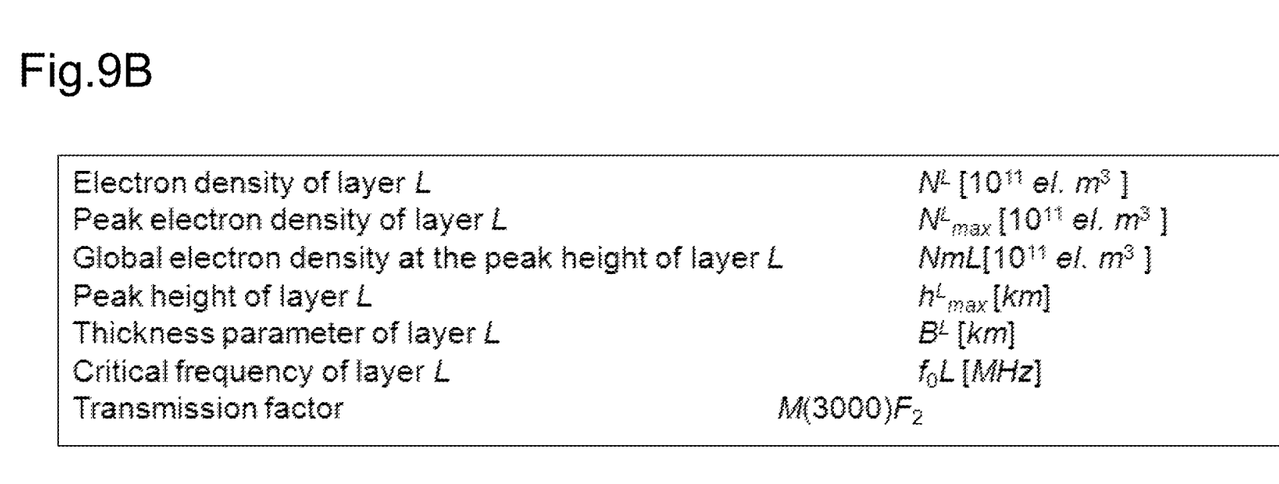
FIG. 9B shows principal parameters and units used in NeQuick.

FIG. 8 shows one example of the NeQuick ionospheric model. The NeQuick ionospheric model shows the distribution of the electron density by height [km]. According this ionospheric model, the ionosphere is divided from top to bottom into an E layer, F1 layer, and F2 layer, so that the region below the peak of F2 layer is referred to as the bottom side of the ionosphere and the region above the peak of F2 layer is referred to as the top side of the ionosphere. In addition, the main variables used in NeQuick are shown in FIG. 9A and the main parameters and units used in NeQuick are shown in FIG. 9B. The NeQuick model is created by using these variables and parameters. Moreover, the detailed calculations are shown in APPENNDIX A.2, or A.3 of the Non-Patent Document 1.

Using this NeQuick model, eventually an sTEC (Slant TEC) along an electric wave path is obtained. It will be appreciated that sTEC is the TEC where a line of sight vector pierces slantingly when the thickness of the ionosphere that the line of sight penetrates changes with the change of the elevation angle of the satellite.

Furthermore, the TEC provided by the NeQuick model is a monthly average value that is distributed to a receiver side as a CCIR file. On the receiver side, the ionospheric delay amount by day is calculated by using the CCIR file and other parameters.

RELATED ART

[Non-Patent Document 1] Bidaine, "Ionosphere Crossing of GALILEO Signals", Master thesis, Belgium, University of Liege, 26-Jun.-2006, P120

SUMMARY OF THE INVENTION

Problems to be Solved by the Invention

Since the amount of calculation to compute the electron density becomes large when calculating the ionospheric delay amount by using the NeQuick, etc., in the GNSS receiver, there is a problem that it takes considerable time to obtain a calculation result. As a result, the positioning operation itself will take time.

Accordingly, an object of the present invention is to calculate the ionospheric delay amount in the GNSS receiver quickly and acquire position information promptly.

BRIEF SUMMARY OF THE INVENTION

In order to achieve the above mentioned purpose, one aspect of the present invention provides a positioning apparatus that performs the positioning based on signals received by an antenna of the GNSS receiver from the positioning satellite and has a pseudo range measurement unit, an ionospheric delay amount calculating unit, and a pseudo range corrector. The pseudo range measurement unit measures the pseudo range between the positioning satellite and the antenna. The ionospheric delay amount calculating unit calculates the ionospheric delay amount included in the pseudo range. The pseudo range corrector performs the positioning calculation by correcting the pseudo range based on the ionospheric delay amount. Moreover, the ionospheric delay amount calculating unit sets the upper limit of a partition number between the positioning satellite and the antenna and decides the total number of electrons by integrating in the range of no more than the upper limit of the partition number, and then calculates the ionospheric delay amount based on the decided total number of electron.

Here, position information can be promptly acquired by reducing significantly the time complexity of the ionospheric delay amount by the ionospheric delay amount calculating unit.

Moreover, the ionospheric delay amount calculating unit sets the predetermined threshold value Th, and when the partition number is $2^n$, may determine that the total number of electrons according to the partition number $2^n$ is $sTEC_N$. And when the total number of electrons according to the partition number $2^{n-1}$ is $sTEC_{N-1}$ and in the case of satisfying $|sTEC_N - sTEC_{N-1}| < Th$, the ionospheric delay amount calculating unit may determine that the total number of electrons is $sTEC_{N-1}$.

In this case, the ionospheric delay amount calculating unit may increase the partition number and repeat the integration until satisfying $|sTEC_N - sTEC_{N-1}| < Th$.

In addition, the ionospheric delay amount calculating unit may set the upper limit of the partition number every time it calculates the ionospheric delay amount.

Moreover, the ionospheric delay amount calculating unit may set the upper limit of the partition number according to the conditions of the positioning operation. Furthermore, the conditions of the positioning operation include, for example, a receiving position, the time of positioning, solar activity, time, etc.

In addition, the ionospheric delay amount calculating unit may set the lower limit of the partition number every time it calculates the ionospheric delay amount and may set the lower limit of the partition number according to the conditions of the positioning operation.

Moreover, the upper limit of the partition number may be $2^3$.

The positioning apparatus, furthermore, comprises a CCIR file processor that creates processed CCIR files by summarizing a plurality of CCIR files corresponding to different months respectively according to the predetermined conditions, and the ionospheric delay amount calculating unit may calculate the ionospheric delay amount based on the processed CCIR files.

Alternatively, the positioning apparatus, furthermore, comprises a CCIR file processor that creates processed CCIR files by reducing the number of bits of a plurality of CCIR files corresponding to different months respectively, and the ionospheric delay amount calculating unit may calculate the ionospheric delay amount based on the processed CCIR files.

Moreover, the CCIR files are files that summarize the value of the general variable factors for forming the ionosphere, such as a position in a geomagnetic field, a season, a solar activity, and time-of-day, etc., every month (from January to December).

Another aspect of the present invention provides the positioning apparatus and a GNSS receiver that comprises an antenna for receiving signals from the positioning satellite.

Yet another aspect of the present invention provides an information terminal device that comprises the GNSS receiver.

Still another aspect of the present invention provides a positioning method that performs the positioning based on the signals received by the antenna of the GNSS receiver from the positioning satellite, and that has a pseudo range measurement unit step for measuring the pseudo range between the positioning satellite and the antenna, an ionospheric delay amount calculating step for calculating the ionospheric delay amount included in the pseudo range, and a pseudo range correction step for performing the positioning calculation by correcting the pseudo range based on the ionospheric delay amount. In this case, in the ionospheric delay amount calculating step, the upper limit of the partition number between the positioning satellite and the antenna is set, the total number of electrons is determined by integrating in the range of less than the upper limit of the partition number, and the ionospheric delay amount is calculated based on the determined total number of electrons.

Still another aspect of the present invention provides a program that executes the positioning method on a computer.

EFFECTS OF THE INVENTION

According to the present invention, the ionospheric delay amount in the GNSS receiver can be calculated quickly and position information can be acquired promptly.

DETAILED DESCRIPTION OF THE EMBODIMENTS

<1. First Embodiment>

According to the first embodiment, signals of L1 frequency from a Galileo satellite are received (first frequency reception), the NeQuick program is started at the GNSS receiver for positioning the receiver 1, the total number of electrons (sTEC) using the NeQuick ionospheric model is calculated, and the ionospheric delay amount is calculated. According to the present embodiment, the computing speed for the ionospheric delay amount is sped up by reducing a time complexity of the computation to the moderate range when computing the ionospheric delay amount.

<1.1 Configuration of the Receiver>

Figure 1:
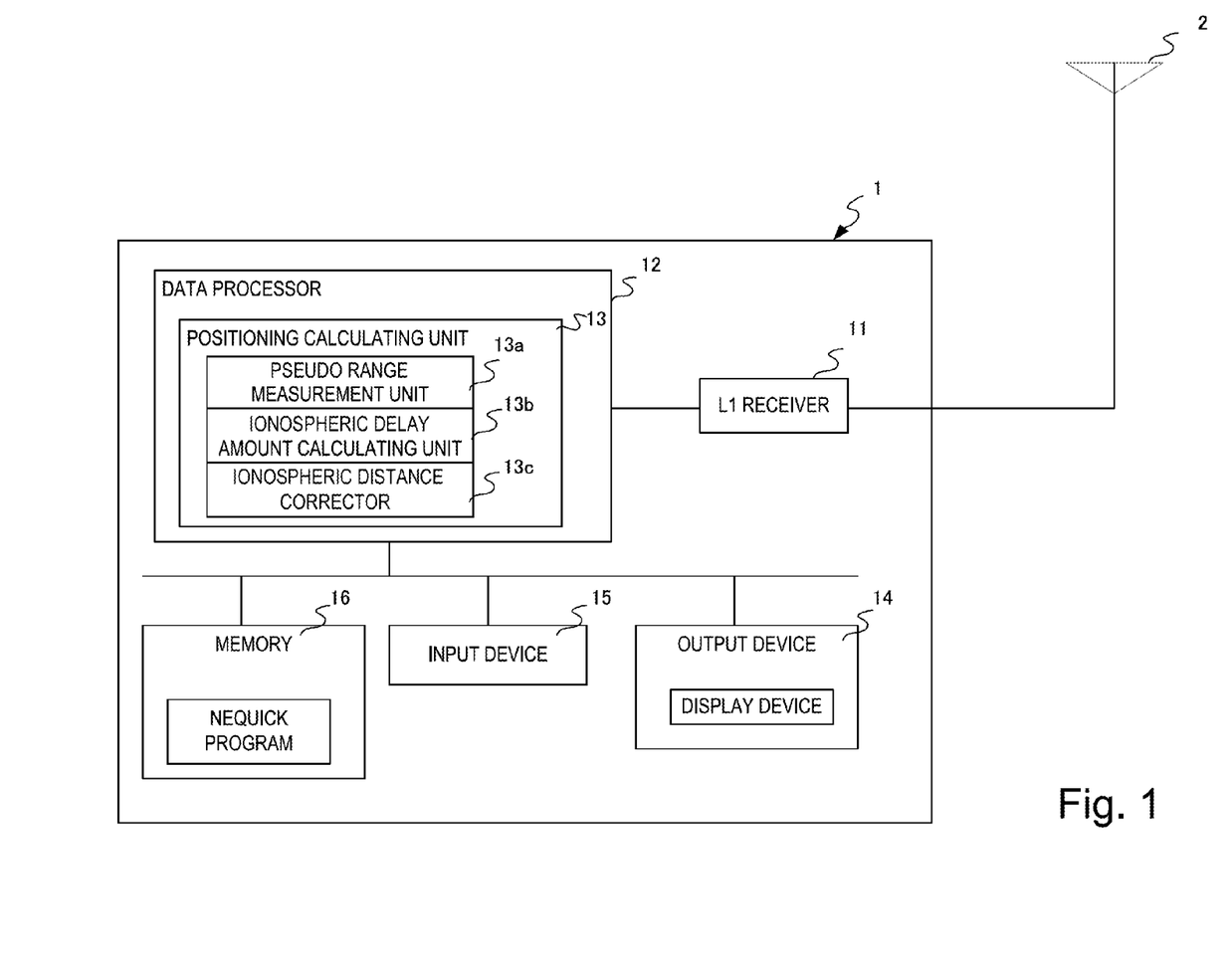
FIG. 1 is a block diagram showing a schematic illustration of the GNSS receiver according to a first embodiment.

FIG. 1 shows a schematic illustration of a receiver 1 according to the present embodiment.

The receiver 1 comprises an antenna 2, an L1 receiver unit 11, a data processor 12, an output device 14, an input device 15, and a memory 16.

Figure 3:
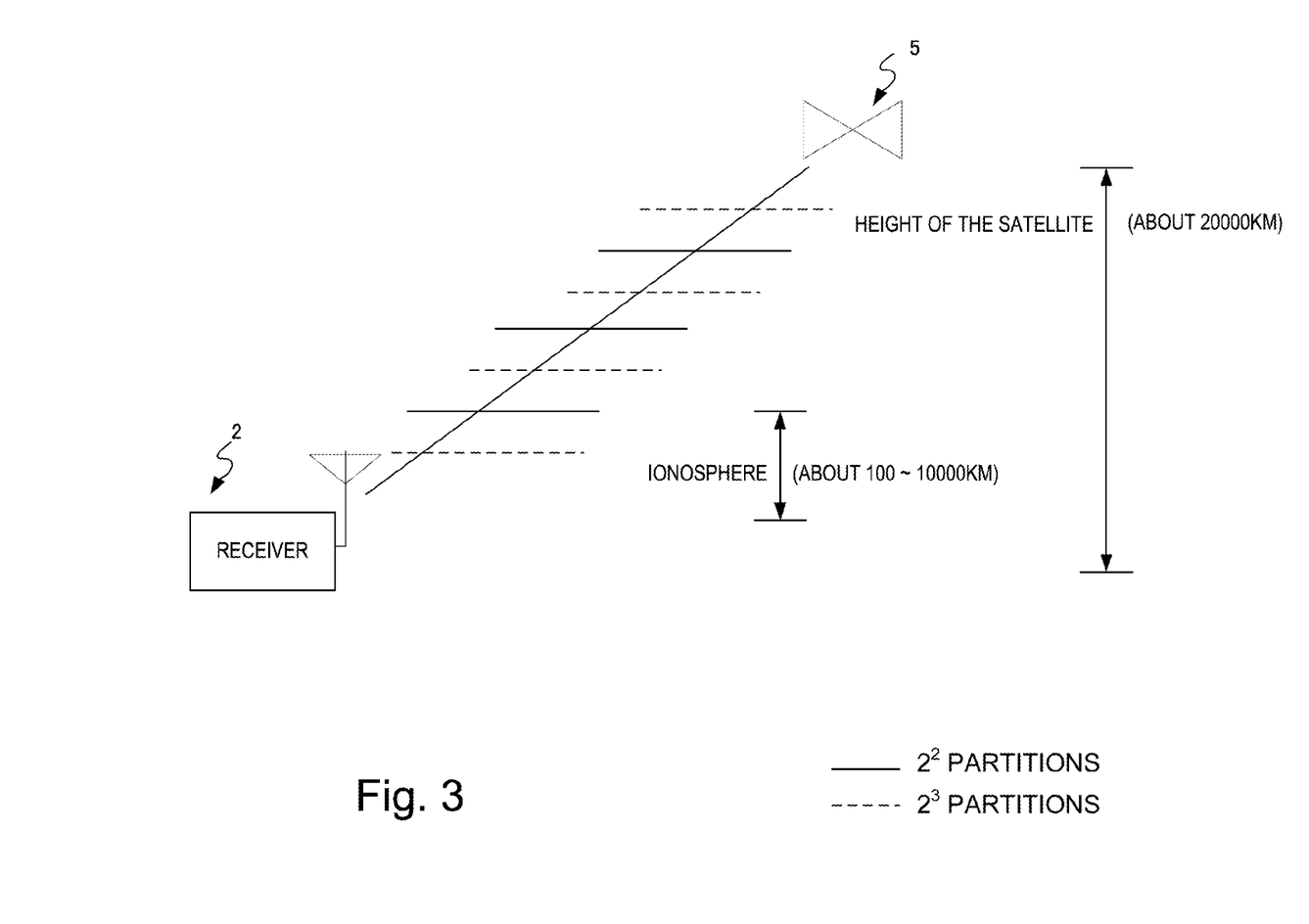
FIG. 3 is a schematic diagram showing a state between the receiver and the satellite.

The antenna 2 receives high frequency signals (L1 frequency signals) sent out from a satellite 5 (FIG. 3).

The L1 receiver unit 11 converts to a signal format that can be processed in the following data processor 12 by down converting high frequency signals from the antenna 2 into intermediate frequency or converting analog signals into digital signals.

The data processor 12 inputs data signals and clock signals from L1 receiver unit 11, decodes the data signals, and performs positioning to ascertain the location of the receiver 1. The data processor 12 includes the positioning calculation unit (positioning apparatus) 13.

The positioning calculation unit 13 includes a pseudo range measurement unit 13a, an ionospheric delay amount calculating unit 13b, and a pseudo range corrector 13c.

The pseudo range measurement unit 13a measures the pseudo range based on the time difference between the transmit time of data sent from the satellite 5 and the receipt time of the same data that the receiver 1 received.

The ionospheric delay amount calculating unit 13b, as described below, starts the NeQuick program and calculates the ionospheric delay amount based on the CCIR files that were stored beforehand and various other parameters. Furthermore, the CCIR files are explained in detail in the second embodiment.

The pseudo range corrector 13c corrects the pseudo range by the ionospheric delay amount calculated by the ionospheric delay amount calculating unit 13b and executes the positioning calculation. In addition, although the pseudo range corrector 13c also corrects the pseudo range related errors (for example, tropospheric delay or time errors, etc.) other than the ionospheric delay amount, an explanation of the correction of these other errors is not provided herein.

The output device 14 includes a display device, and outputs or displays the position information that the receiver 1 obtained from the positioning result.

The input device 15 receives the information inputted from a user's operations via a touch panel, a push buttons, etc.

The memory 16 consists of RAM or ROM, and stores each program including NeQuick and various other data. In addition, the number of the memory 16 may not be limited, and the type may include either or both of an internal memory or an external memory.

According to the present embodiment, for example, the positioning calculation unit 13, the data processor 12, and the L1 receiver unit 11 may be configured as one integrated circuit chip, or may be configured with separate chips. Moreover, the receiver 1 may also be configured with either a single device or a plurality of devices.

<1.2 Operation of the Receiver>

Figure 2:
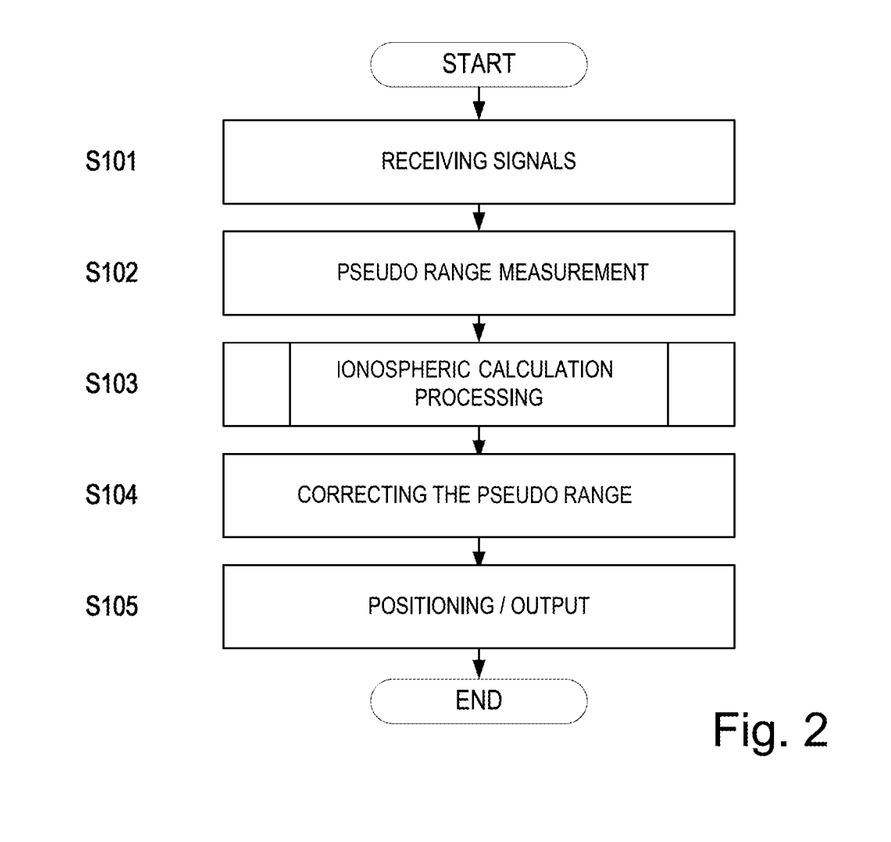
FIG. 2 is a flow chart showing operations of the GNSS receiver according to the first embodiment.

FIG. 2 is a flow chart showing operations of the receiver according to the present embodiment.

S101: The antenna 2 of the receiver 1 receives signals from the satellite, and the signals are converted to predetermined data signals by the L1 receiver unit 11.

S102: The pseudo range measurement unit 13a of the positioning calculation unit 13 measures the pseudo range based on the time difference between the transmit time of data sent from the satellite and the receipt time of the same data that the receiver 1 received.

S103: The ionospheric delay amount calculating unit 13b starts the NeQuick program and calculates the ionospheric delay amount as described below.

S104: The pseudo range corrector 13c corrects the pseudo range according to the ionospheric delay amount.

S105: The positioning calculation is executed by correcting the pseudo range, and the result is output and displayed by the output device 14.

<1.3 Calculation Processing of the Ionospheric Delay Amount>

Hereinafter, the calculation processing of the ionospheric delay amount by the ionospheric delay amount calculating unit 13b according to the present embodiment will be described in detail.

In the past, calculation using the NeQuick model was considerably time consuming. This was caused by the integration calculated by the NeQuick program to calculate the total number of electrons (sTEC) for the line of sight between the satellite 5 and the antenna.

This integration, as shown in FIG. 3, is performed by dividing a distance between two points (between the satellite and the antenna in case of the satellite positioning) into $2^3$ to $2^9$ regions and summing up the electron density for each. Therefore, in order to estimate the total number of electrons correctly, it is necessary to divide into the regions between two points finely. However, the L1 frequency (1575.42 MHz) for the ionospheric delay amount using at the Galileo satellite is about 16 cm per electron density 1 TECU. From this, the present inventors conceived that the ionospheric delay amount could be presumed to be within an acceptable range of error, even though the partition number was not fine during integration calculation.

<1.3.1 Setting of Conditions>

In the present embodiment, under the conditions shown in Table 1 below, the ionospheric delay amount is calculated. Here, a satellite located eastward by about a six degree angle of elevation is assumed. Moreover, a sunspot number and a time at which the ionospheric delay amount becomes large are set.

TABLE 1

| Input parameter | Setting | Note |
|---|---|---|
| End point 1 | Lat. 20.0 N, Long. 0.0 E Height 0 km | Antenna |
| End point 2 | Lat. 20.0 N, Long. 75.0 E Height 20000 km | Satellite |
| R12 | 201.3 | Sunspot number |
| UT | 12.0 | Universal time |
| Month | 10 | For 2.1 |

<1.3.2 Calculation Results>

Table 2 below shows the ionospheric delay amount (Reduced) when the upper limit of the partition number for the integration calculation according to the present embodiment is set for the ionospheric delay amount (Original) calculated by the conventional NeQuick program, and the rounding errors (Delta) of both ionospheric delay amounts.

TABLE 2

| Partition number | Ionospheric delay amount (L1[m]) | | |
|---|---|---|---|
| | Original | Reduced | Delta |
| 4 | 71.037 | 67.832 | −3.205 |
| 8 | 71.037 | 70.105 | −0.932 |
| 16 | 71.037 | 70.850 | −0.187 |
| 32 | 71.037 | 71.016 | −0.021 |
| 64 | 71.037 | 71.048 | 0.010 |
| 128 | 71.037 | 71.040 | 0.002 |
| 256 | 71.037 | 71.061 | 0.023 |

Moreover, according to the NeQuick program, when the difference between the total number of electrons calculated by the partition number $2^{n-1}$ and the total number of electrons calculated by the partition number $2^n$ is less than the predetermined threshold value Th, the ionospheric delay amount is calculated by determining the partition number as $2^{n-1}$. In the above table, the ionospheric delay amount calculated by the finally determined partition number $2^{n-1}$ is 71.037 m.

In Table 2, a quite large ionospheric delay amount has been generated because conditions of active solar activity and a low elevation angle of the satellite in daytime are assumed. However, even if the partition number is 8 (=$2^3$), the ionospheric delay amount according to the present embodiment has errors within only less than 1 m compared with the calculation by the conventional NeQuick program.

Therefore, even if the partition number is set to "8" and the ionospheric delay amount is calculated, it turns out that a sufficient measurement system can be assured. On the other hand, the time complexity can be reduced by establishing the upper limit of the partition number.

<1.3.3 Contents of the Calculation Processing>

Figure 4:
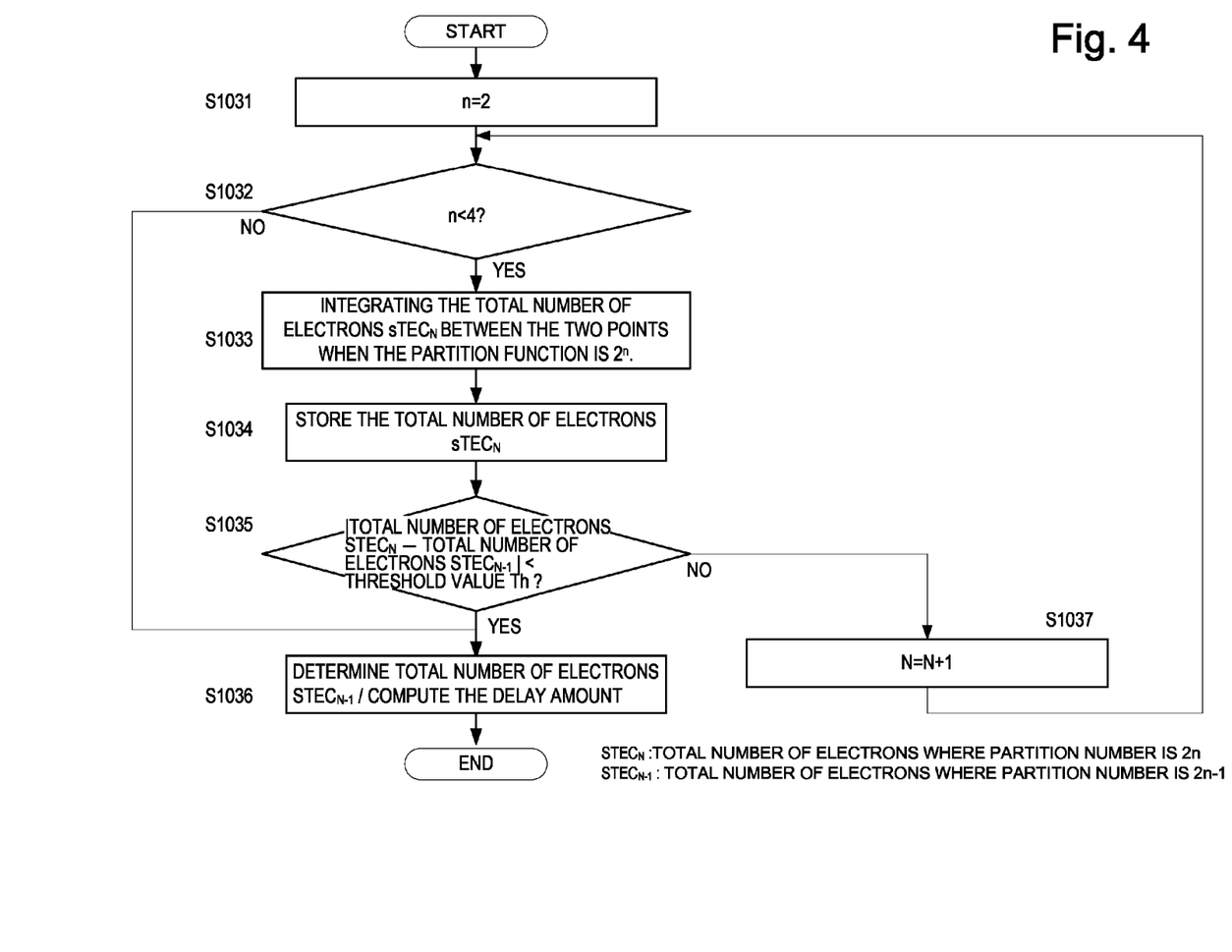
FIG. 4 is a flow chart showing the calculation processing of the ionospheric delay amount according to first embodiment.

FIG. 4 is a flow chart showing the contents of the calculation processing (Step 103 in FIG. 2) by the ionospheric delay amount calculating unit 13b according to the present embodiment. As above described, for the calculation of the ionospheric delay amount, the NeQuick program is executed at the receiver 1 and the ionospheric delay amount is calculated based on the NeQuick model.

In addition, in the flow chart, when performing integral calculations to determine the total number of electrons sTEC between the two points between the satellite and the antenna, n is the index number n of the partition number $2^n$ between the two points.

S1031: Setting n=2. The lower limit of the partition number of the two points between the satellite and the antenna is set to $2^2$. In addition, this lower limit of the partition number shall be set beforehand by the ionospheric delay amount calculating unit 13b.

S1032: Determining whether n<4 or not. The upper limit of the partition number of the two points between the satellite and the antenna is set to $2^3$. Therefore, if n<4 is not true, the ionospheric delay amount is determined by proceeding to step S1036, and if n<4 is true, integration is continued by proceeding to S1033.

In addition, this upper limit of the partition number shall be set beforehand by the ionospheric delay amount calculating unit 13b.

S1033: The total number of electrons $sTEC_N$ between two points between the satellite and the antenna is integrated when the partition number is $2^n$.

S1034: The total number of electrons $sTEC_N$ calculated in step S1033 is stored in memory. The $sTEC_N$ is the total number of electrons when the partition number for the two points between the satellite and the antenna is $2^n$.

S1035: Determining whether the difference (absolute value) between the total number of electrons $sTEC_N$ and the total number of electrons $sTEC_{N-1}$ (the stored total number of electrons in memory when the partition number is $2^{n-1}$) is less than the predetermined threshold value Th. Here, the predetermined threshold value Th is the threshold value set beforehand in the NeQuick program, and the value is set to a sufficiently small value, such that the extent of the error of the ionospheric delay amount according to the partition number can be disregarded (for example, 1/1000 of the previous value $sTEC_{N-1}$).

S1036: When the difference of the total number of electrons according to the partition number in the step S1035 is determined to be less than the threshold value Th, or when the partition number in the step S1032 is judged to be in the excess of $2^3$, the total number of electrons is determined to be $sTEC_{N-1}$, the ionospheric delay amount is calculated (formula 1), and the result is output into the pseudo range corrector 13c.

S1037: When the difference in the total number of electrons according to the partition number in the step S1035 is determined to be more than the threshold value Th, n is incremented and the process flow returns to step S1032. Subsequently, when the partition number is judged to be less than $2^3$ in the step S1032, the integration is repeated as the partition number is increased (step S1033 to 1034) until the condition of the step S1035 is fulfilled.

In addition, the contents of processing by the ionospheric delay unit 13b are one example, and neither an order nor a setup of each processing is limited to that described above. For example, the upper limit of the partition number $2^n$ may not be set to $2^3$ but rather it may be fluctuated according to conditions. Moreover, an initial value of n is not also limited to 2, for example, it may be 3 (that is, an integration value is calculated only once).

<1.4 Effect of the First Embodiment>

In the above mentioned embodiment, the receiver 1 that started the NeQuick program sets the upper limit of the partition number of the two points between the satellite and the antenna when the total number of electrons is determined by integration by the ionospheric delay amount calculating unit 13b of the positioning calculation unit 13. Thereby, the time complexity of the ionospheric delay amount by the ionospheric delay amount calculating unit 13b is reduced significantly. As a result, the positioning calculation by the positioning calculation unit 13 is performed quickly and the position information can be acquired promptly.

<1.5 Modification of the First Embodiment>

In the above explanation, although the upper limit and/or the lower limit of the partition number are set beforehand when the total number of electrons between the two points between the satellite and the antenna is determined by integration, the present embodiment is not limited thereto.

The upper limit and/or the lower limit of the partition number can also be set one by one at the ionospheric delay amount calculating unit.

In this case, for every processing step shown in FIG. 4, the ionospheric delay amount calculating unit 13b determines the upper limit and/or the lower limit of the partition number.

Furthermore, a plurality of values for the upper limit and/or the lower limit of the partition number may be set according to the positioning conditions, such as for each satellite, and for each absolute value of the delay amount, the receiving position, time of positioning, solar activity, and time, etc. In addition, by storing a plurality of values of the upper limit and/or the lower limit of the partition number beforehand, and choosing the partition number corresponding to the time when the same conditions exist, the ionospheric delay amount may be calculated.

<1.6 Evaluation of the First Embodiment>

Hereinafter, under some conditions, the estimated error is evaluated when calculating the ionospheric delay amount according to the present embodiment.

<1.6.1 Conditions>

Table 3 below shows the conditions that were set. Test 1 and Test 2 are satellites located due south, with two patterns that were set for a high elevation angle and a low elevation angle respectively, and the estimated errors that were calculated for both daytime and nighttime respectively. Test 3 and Test 4 are satellites located in the east direction, with two patterns that were set for a high elevation angle and a low elevation angle respectively, and estimated errors that were calculated for both daytime and nighttime respectively as well.

Three patterns were set for R12 (monthly sunspot number), namely, a minimum, an average, and a maximum of the observed value from 1931 to 2001.

TABLE 3

|  | Test 1 | Test 2 | Test 3 | Test 4 |
| --- | --- | --- | --- | --- |
| Elevation angle [deg.] | 6 | 51 | 6 | 53 |

TABLE 3-continued

|  | Test 1 | Test 2 | Test 3 | Test 4 |
|---|---|---|---|---|
| Direction [deg.] | 180 | 180 | 71 | 73 |
| R12 |  | 23.4, 65.4, 201.3 |  |  |
| UT | 0.0 & 14.0 |  | 0.0 & 12.0 |  |
| Month |  | All months |  |  |

<1.6.2 Estimated Errors>

Table 4 shows the estimated errors of each R12. In addition, depending on the R12 value, the absolute value of the ionospheric delay amount may be changed, and the estimated error also tends to be changed depending on R12. Although the error was the largest when R12 was set to "201.3", about 1 m at the maximum and about 0.2 m for 1 sigma were presumed.

TABLE 4

| | L1 Ionospheric delay amount [m] | | |
|---|---|---|---|
| R12 | Average | 1-sigma | Maximum |
| 23.4 | −0.008 | 0.097 | 0.163 |
| 65.4 | 0.018 | 0.132 | 0.289 |
| 201.3 | 0.091 | 0.229 | 1.026 |

The above result shows that even if the time complexity of the ionospheric delay amount is reduced according to the first embodiment, it will be understood that the presumed errors of the ionospheric delay amount will be within an acceptable range under what kind of conditions.

<2. Second Embodiment>

According to the second embodiment, the GNSS receiver reduces the space complexity in the moderate range when calculating the ionospheric delay amount.

<2.1 Configuration of the Receiver>

Figure 5:
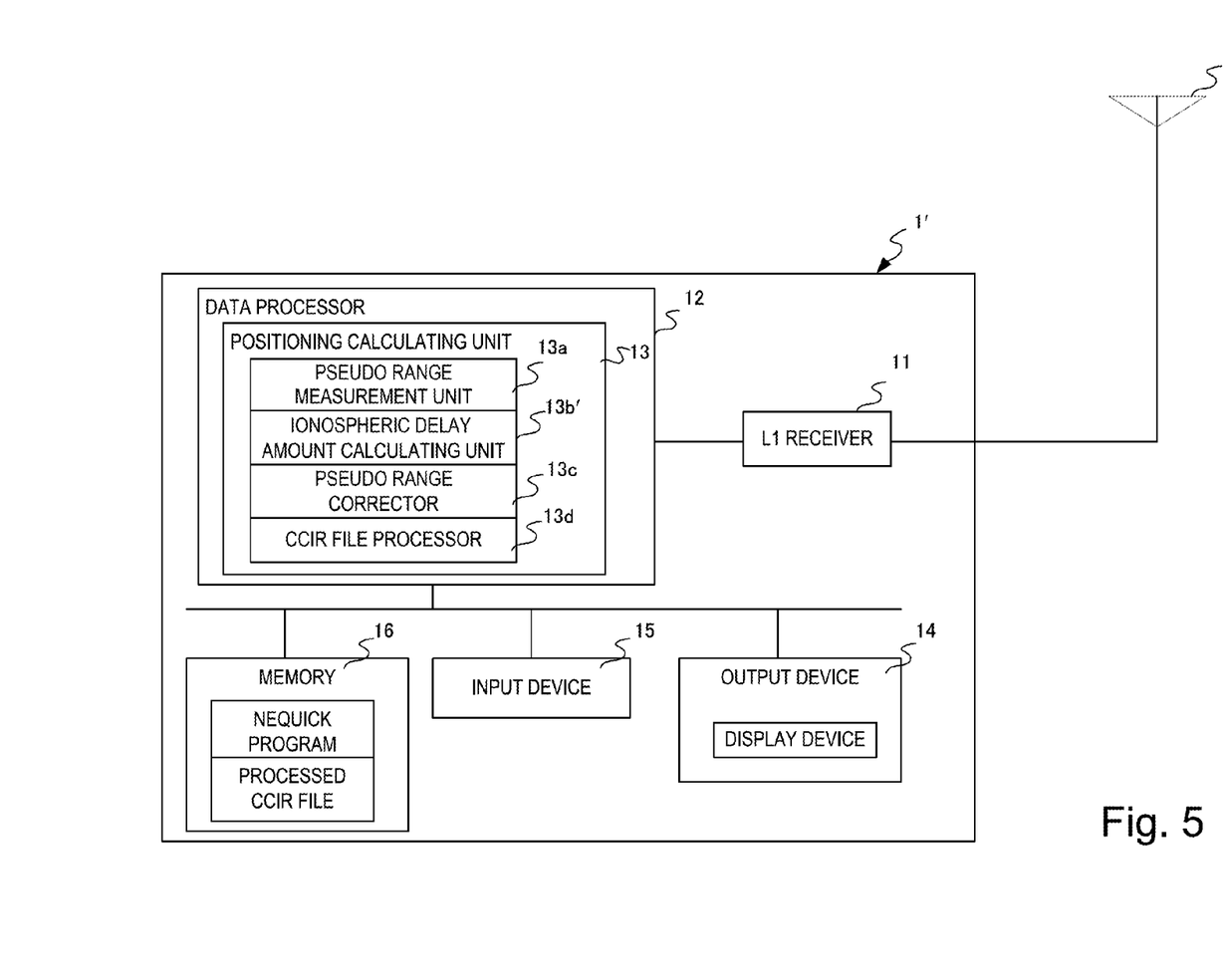
FIG. 5 is a block diagram showing a schematic illustration of the GNSS receiver according to a second embodiment.

FIG. 5 shows a configuration of the GNSS receiver 1' according to the present embodiment. The configuration of the GNSS receiver 1' differs from the one according to the first embodiment (FIG. 1) in the following respects.

The positioning calculation unit 13 is equipped with a CCIR file processor 13d. The size of the CCIR files that were executed to reduce processing by the CCIR file processor 13d is provided. (Hereinafter, "the processed CCIR files".) The ionospheric delay amount calculating unit 13b' calculates the ionospheric delay amount based on the processed CCIR files. Other configurations are similar to the first embodiment (FIG. 1). Components that are similar to the configuration of FIG. 1 are labeled with the same reference letters or numerals, and a detailed explanation thereof is not provided.

Regarding the CCIR files (the unprocessed CCIR files) stored in memory 16, etc. beforehand, the CCIR file processing part 13d creates the processed CCIR file by executing the reduction processing of the size as described below.

The CCIR files (or CCIR map) are the files that summarized the values of the general variable factors for forming the ionosphere, such as a position in a geomagnetic field, a season, a solar activity, and time-of-day, etc., every month (from January to December).

In addition, although the detailed explanation was not provided, also according to the above mentioned first embodiment, the predetermined CCIR files (unprocessed) is stored beforehand, the total number of electrons sTEC is calculated with reference to the CCIR file, and the ionospheric delay amount is calculated.

<2.2 Operation of the Receiver>

The GNSS receiver 1' according to the present embodiment operates in the same manner as the first embodiment (FIG. 2) except executing the calculation processing of the ionospheric delay amount by using the processed CCIR files.

<2.3 Calculation Processing of the Ionospheric Delay Amount>

Hereinafter, the calculation processing of the ionospheric delay amount by the ionospheric delay amount calculating unit 13b' according to the present embodiment will be described in detail The CCIR file processor 13d reduces the size of the CCIR files being used for calculating the ionospheric delay amount, as follows.

<2.3.1 Size Reduction Processing of Each File>

Conventionally, in a CCIR file, one value is expressed by 32 bits, so that about 11.4 bytes (32 bits x2858) per 1 file (for one month) is needed. However, the present inventors conceived that even if each value of the CCIR files is expressed by half as many bits, i.e., 16 bits, as a result, there is no large influence on the ionospheric delay amount. Then, each value of the CCIR files was expressed by 16 bits so that integer part might not overflow. By reducing the bit number of each value of the CCIR files from 32 bits to 16 bits, the space complexity was reduced to about half.

The following Table 5 shows the rounding errors of the ionospheric delay amount in the case of expressing each value of the CCIR files by 16 bits. In addition, Table 5 shows the ionospheric delay amount (Original) calculated based on the conventional CCIR files that expressed each value by 32 bits, the ionospheric delay amount (Reduced) calculated based on the CCIR files that expressed each value by 16 bits, and the rounding errors (Delta) of both ionospheric delay amounts.

TABLE 5

| | Ionospheric delay amount (L1 [m]) | | |
|---|---|---|---|
| Month | Original | Reduced | Delta |
| 1 | 48.725 | 50.046 | 1.321 |
| 2 | 47.136 | 46.201 | −0.935 |
| 3 | 55.318 | 53.901 | −1.417 |
| 4 | 45.779 | 45.621 | −0.158 |
| 5 | 41.806 | 39.930 | −1.876 |
| 6 | 31.950 | 31.373 | −0.577 |
| 7 | 34.172 | 34.692 | 0.520 |
| 8 | 36.283 | 37.042 | 0.760 |
| 9 | 40.921 | 42.502 | 1.582 |
| 10 | 71.037 | 72.095 | 1.057 |
| 11 | 78.011 | 79.229 | 1.219 |
| 12 | 47.703 | 46.035 | −1.668 |

Although a large ionospheric delay amount is shown in each month, the rounding errors between when using the Original CCIR files and when using the Reduced CCIR files (processed CCIR files) were within 2 m. Therefore, even if 16 bits expressed each value of the CCIR files, it was proved that there was no large influence in the calculated ionospheric delay amount.

<2.3.2 Reduction Processing of the Number of Files>

As described above, the CCIR file is data on a monthly basis and 12 files exist in all. As described above, even if the size becomes half by reducing each value to 16 bits, still 68.6 byte is needed. Then, the present inventor examined to reduce the size of these files further in the range of not affecting the ionospheric delay amount.

Specifically, it was decided to summarize these files for each month to some extent. In this case, the average value of the month in which the change of the value is small as much as possible is taken, and it is made one file. The way of summarizing, i.e., manner of grouping, is shown in FIG. 6.

Figure 6:
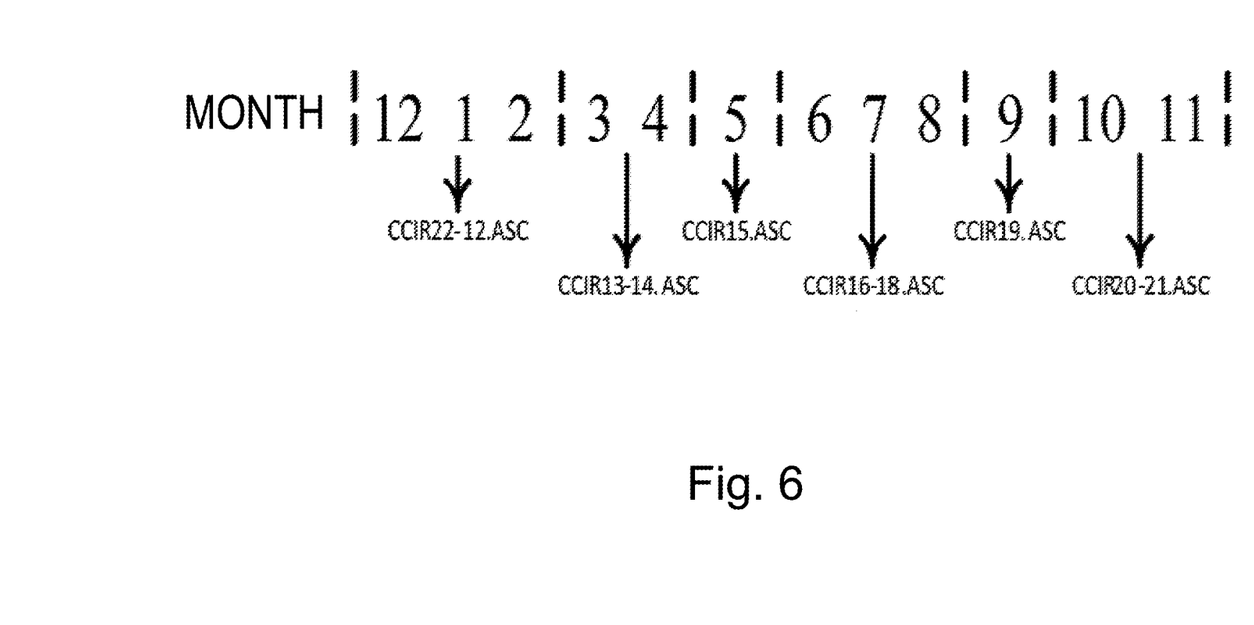
FIG. 6 is a drawing for explaining a size reduction processing of a plurality of files according to the second embodiment.

As shown in FIG. 6, the groups of the different months (12, 1, 2), (3, 4), (5), (6, 7, 8), (9), (10, 11), in which the difference of the values is small, i.e., the difference of the values is not more than the predetermined value, are summarized, the average values of each value for each group are taken, and are represented as one file. Thereby, the number of files can be reduced from 12 to 6.

In addition, according to the present embodiment, although it was grouped by taking the average value of the CCIR file values of each group, it is not restricted to this, but it may be grouped by taking the representative value, such as a median and a mode.

Table 6 shows the result of calculating the ionospheric delay amount of each month, after grouping each CCIR file in Table 5 as mentioned above (Reduced). By using the grouped CCIR files (processed CCIR files), the influence on the positioning result may be small. As the above result, the data size of the processed CCIR files shown in Table 6 can be reduced up to about ¼ of the Original case.

TABLE 6

| Month | Ionospheric delay amount (L1 [m]) | | |
|---|---|---|---|
| | Original | Reduced | Delta |
| 1 | 48.725 | 47.747 | −0.978 |
| 2 | 47.136 | 47.592 | 0.456 |
| 3 | 55.318 | 55.565 | 0.246 |
| 4 | 45.779 | 45.136 | −0.643 |
| 5 | 41.806 | 41.806 | 0.000 |
| 6 | 31.950 | 34.111 | 2.161 |
| 7 | 34.172 | 34.111 | −0.061 |
| 8 | 36.283 | 34.094 | −2.189 |
| 9 | 40.921 | 40.921 | 0.000 |
| 10 | 71.037 | 74.315 | 3.278 |
| 11 | 78.011 | 74.530 | −3.481 |
| 12 | 47.703 | 47.809 | 0.106 |

As mentioned above, the processed CCIR file by which size was reduced by the CCIR file processing part 13*d* are stored in the memory 16.

In addition, although the above explained that both the size reduction processing of each file and the reduction processing of the number of files are executed, the memory space can be reduced even if only one of these techniques is adopted.

<2.3.3 Contents of the Calculation Processing>

Figure 7:
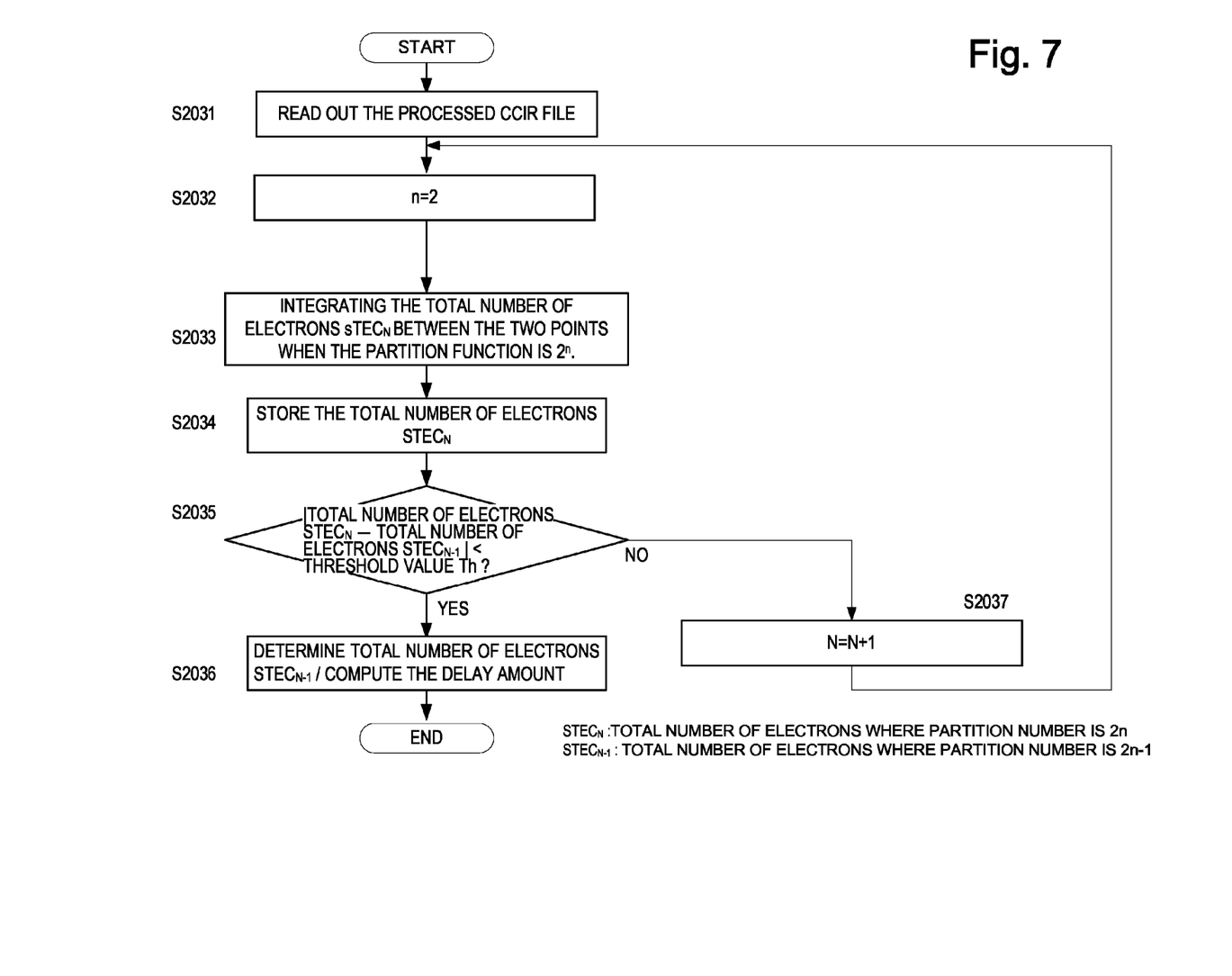
FIG. 7 is a flow chart showing a calculation processing of the ionospheric delay amount according to the second embodiment.

FIG. 7 shows the contents of the calculation processing of the ionospheric delay amount according to the present embodiment. The ionospheric delay amount calculating unit 13*b'* according to the present embodiment, as well as the first embodiment, uses the NeQuick model for calculating the ionospheric delay amount and calculates the ionospheric delay amount by executing the NeQuick program in the receiver 1'.

Moreover, in the flow chart, when integrating the total number of electrons sTEC between the satellite and the antenna, n is the index n of the partition number $2^n$ of the same two points.

S2031: Reading out the processed CCIR files from the memory 16.

S2032: Setting up n=2. The lower limit of the partition number between the two points of the satellite and the antenna is $2^2$, here.

S2033: Integrating the total number of electrons $sTEC_N$ between the two points of the satellite and the antenna in the case of the partition number $2^n$ based on the read processed CCIR files.

S2034: Storing the total number of electrons $sTEC_N$ calculated in the step S2033 into the memory 16. Furthermore, $sTEC_N$ is the total number of electrons when the partition number between the two points of the satellite and the antenna is $2^n$.

S2035: Determining whether the difference (absolute value) between the total number of electrons $sTEC_N$ and the total number of electrons $sTEC_{N-1}$ (the total number of electrons stored in the memory when the partition number is $2^{n-1}$) is less than the predetermined threshold value Th. Here, the predetermined threshold value Th is the threshold value set beforehand in the NeQuick program, and the value is set to a sufficiently small value such that the extent of the error of the ionospheric delay amount according to the partition number can be disregarded (for example, 1/1000 of the previous value $sTEC_{N-1}$).

S2036: When the error in the total number of electrons based on the partition number in the Step S2035 is determined to be less than the threshold value Th, the total number of electrons is determined as $sTEC_{N-1}$, the ionospheric delay amount is calculated (Formula 1), and the result is outputted to the pseudo range corrector 13*c*.

S2037: When the error in the total number of electrons based on the partition number in the Step S2035 is determined to be more than the threshold value Th, n is incremented and the process flow returns to the Step S2033.

In addition, the contents of processing by the ionospheric delay unit 13*b* discussed above are one example, and neither the order nor the setup of each processing step is limited to the above. For example, an initial value of n is not limited to 2; for example, it may be 3.

<2.4 Effect of the Second Embodiment>

In the above mentioned embodiment, the receiver 1' that started the NeQuick program uses the processed CCIR files of reduced size when the total number of electrons is calculated by the ionospheric delay amount calculating unit 13*b'* of the positioning calculation unit 13. Therefore, the required memory space for calculating the ionospheric delay amount by the ionospheric delay amount calculating unit 13*b* can be reduced, and the space complexity in the receiver 1' is reduced significantly.

<2.5 Modification of the Second Embodiment>

In the above explanation, although the CCIR file processor 13*d* executes the data reduction processing on the CCIR files beforehand and stores the result in the memory 16 as the processed CCIR files, the present embodiment is not limited thereto.

The reduction processing on the CCIR files can be executed one by one at the time of the calculation of the ionospheric delay amount by the ionospheric delay amount calculating unit 13*b'*.

In this case, for each processing step of FIG. 7, the CCIR file processor 13*d* executes either or both the size reduction processing of the each file and the reduction processing of the number of files, and the ionospheric delay amount calculating unit 13*b'* calculates the ionospheric delay amount according to the created processed CCIR files.

<3. Third Embodiment>

According to the third embodiment, the GNSS receiver calculates the ionospheric delay amount by the both above mentioned first and second embodiments.

<3.1 Configuration of the Receiver>

The configuration of the GNSS receiver according to the present embodiment is the same as that of the second embodiment (FIG. 5).

<3.2 Operation of the Receiver>

The GNSS receiver according to the present embodiment operates similar to that of the first embodiment (FIG. 2) except the contents of the calculation processing of the ionospheric delay amount explained below.

<3.3 Calculation Processing of the Ionospheric Delay Amount>

In the calculation processing of the ionospheric delay amount according to the present embodiment, the ionospheric delay amount calculating unit 13b reads out the processed CCIR files (second embodiment; step S2031 in FIG. 7), as well as sets the upper limit of the partition number where integrating between the two points between the satellite and the antenna, and calculates the ionospheric delay amount (first embodiment; from step S1031 to step S1037 in FIG. 4).

In addition, in the present embodiment as well as in the modification of the above mentioned second embodiment, the CCIR file processor 13d may execute the reduction processing on the CCIR files one by one when calculating the ionospheric delay amount by the ionospheric delay amount calculating unit 13b'.

<3.4 Effect of the Third Embodiment>

In the above mentioned embodiment, the receiver 1' that started the NeQuick program sets the upper limit between the two points between the satellite and the antenna when the total number of electrons is determined by integration by the ionospheric delay amount calculating unit 13b' of the positioning calculation unit 13 and still uses the processed CCIR files that have been reduced in size. Thereby, the time complexity and the space complexity of the ionospheric delay amount by the ionospheric delay amount calculating unit 13b' are reduced.

<3.5 Evaluation of the Third Embodiment>

Hereinafter, under some conditions, the estimated errors in the case of calculating the ionospheric delay amount according to the present embodiment are evaluated.

<3.5.1 Conditions>

The parameters of each condition are the same as those of the first embodiment (Table 3).

<3.5.2 Estimated Errors>

Table 7 shows the estimated error of each R12. Moreover, the absolute value of the ionospheric delay amount may be different according to the value of R12 and the estimated error also tends to change. Although the error was the largest when R12 was set to "201.3", about 7 m at the maximum and about 2.1 m for 1 sigma were presumed.

TABLE 7

| | L1 Ionospheric delay amount [m] | | |
| --- | --- | --- | --- |
| R12 | Average | 1-sigma | Maximum |
| 23.4 | 0.085 | 0.659 | 2.134 |
| 65.4 | 0.205 | 0.759 | 2.945 |
| 201.3 | 0.275 | 2.115 | 7.021 |

The above result shows that when the time complexity and space complexity of the ionospheric delay amount are reduced according to the third embodiment, even if the presumed errors of the ionospheric delay amount will be larger than when only the time complexity is reduced according to the first embodiment, it is understand that they will be within an acceptable range.

<4 Other Embodiments>

The embodiment of the present invention is not limited to the above described embodiments and various modifications, changes, and combinations may be made without departing from the scope of the present invention. Moreover, although the above described embodiments are essentially desirable examples, the present invention, its applications, and its use are not intended to limit the scope of the invention.

For example, in the above mentioned embodiment, although the positioning calculation unit 13 and the data processor 12 are explained to be integrated circuits, the present invention can be practiced as a positioning method or as a computer program using a processor and memory. Moreover, the present invention can be practiced as an information terminal device (including a mobile terminal device) equipped with an integrated circuit.

EXPLANATION OF REFERENCE CHARACTERS, LETTERS, AND NUMERALS

1 GNSS receiver
2 Antenna
5 Satellite
11 L1 receiver unit
12 Data processor
13 Positioning calculation unit (Positioning apparatus)
13a Pseudo range measurement unit
13b Ionospheric delay amount calculating unit
13c Pseudo range corrector
13d CCIR file processor
14 Output device
15 Input device
16 Memory
1' GNSS receiver
13b' Ionospheric delay amount calculating unit

The invention claimed is:

1. A positioning apparatus that executes positioning based on signals received by an antenna of a GNSS receiver from a positioning satellite, comprising:
 a pseudo distance measurement unit configured to measure a pseudo distance between the positioning satellite and the antenna;
 an ionosphere delay amount calculating unit configured to calculate an ionosphere delay amount included in the pseudo distance; and
 a pseudo distance corrector configured to execute a positioning calculation by correcting the pseudo distance based on the ionosphere delay amount;
 wherein the ionosphere delay amount calculating unit sets an upper limit of a partition number between the positioning satellite and the antenna, determines a total number of electrons by integrating over a range up to the upper limit of the partition number, and calculates the ionosphere delay amount based on the determined total number of electrons.

2. The positioning apparatus according to the claim 1, wherein the ionosphere delay amount calculating unit sets a predetermined threshold value Th, when the partition number is $2^n$, determines that the total number of electrons according to the partition number $2^n$ is $sTEC_N$, and when the total number of electrons according to the partition number $2^{n-1}$ is $sTEC_{N-1}$, and in the case of satisfying $|sTEC_N-sTEC_{N-1}|<Th$, determines that the total number of electrons is $sTEC_{N-1}$.

3. The positioning apparatus according to claim 2, wherein the ionosphere delay amount calculating unit increases the partition number and repeats the integration until satisfying the $|sTEC_N-sTEC_{N-1}|<Th$.

4. The positioning apparatus according to claim 1, wherein the ionosphere delay amount calculating unit sets the upper limit of the partition number each time it calculates the ionosphere delay amount.

5. The positioning apparatus according to the claim 1, wherein the ionosphere delay amount calculating unit sets the upper limit of the partition number according to the conditions of positioning.

6. The positioning apparatus according to the claim 1, wherein the ionosphere delay amount calculating unit sets the lower limit of the partition number each time it calculates the ionosphere delay amount and sets the lower limit of the partition number according to the conditions of positioning.

7. The positioning apparatus according to the claim 1, wherein the upper limit of the partition number is $2^3$.

8. The positioning apparatus according to the claim 1, comprising:
a CCIR file processor that creates processed CCIR files by summarizing a plurality of CCIR files corresponding to different months respectively according to the predetermined conditions, and wherein the ionosphere delay amount calculating unit calculates the ionosphere delay amount based on the processed CCIR files.

9. The positioning apparatus according to the claim 1, comprising:
a CCIR file processor configured to create processed CCIR files by reducing the number of bits of a plurality of CCIR files corresponding to different months respectively;
wherein, moreover, the ionosphere delay amount calculating unit calculates the ionosphere delay amount based on the processed CCIR files.

10. A GNSS receiver, comprising;
the positioning apparatus described in claim 1, and
an antenna configured to receive signals from the positioning satellite.

11. An information terminal device, comprising;
the GNSS receiver according to the claim 10.

12. A positioning method for executing positioning based on the signals received by the antenna of the GNSS receiver from the positioning satellite, comprising the steps of:
a pseudo distance measurement unit, with a step of measuring the pseudo distance between the positioning satellite and the antenna;
an ionosphere delay amount calculating unit, with a step of calculating the ionosphere delay amount included in the pseudo distance; and
a pseudo distance corrector, with a step of executing the positioning calculation by correcting the pseudo distance based on the ionosphere delay amount;
wherein the ionosphere delay amount calculating unit sets the upper limit of the partition number between the positioning satellite and the antenna, determines the total number of electrons by integrating over a range up to the upper limit of the partition number, and calculates the ionosphere delay amount based on the determined total number of electrons.

13. A program for making a computer execute a positioning method that performs the positioning based on the signals received by the antenna of the GNSS receiver from the positioning satellite, the method comprising the steps of;
a pseudo distance measurement unit, with a step of measuring the pseudo distance between the positioning satellite and the antenna,
an ionosphere delay amount calculating unit, with a step of calculating the ionosphere delay amount included in the pseudo distance, and
a pseudo distance corrector, with a step of executing the positioning calculation by correcting the pseudo distance based on the ionosphere delay amount;
wherein the ionosphere delay amount calculating unit sets the upper limit of the partition number between the positioning satellite and the antenna, determines the total number of electrons by integrating over a range up to the upper limit of the partition number, and calculates the ionosphere delay amount based on the determined total number of electrons.

* * * * *